United States Patent
Bird-Radolovic et al.

(10) Patent No.: US 8,174,153 B2
(45) Date of Patent: May 8, 2012

(54) COMMUNICATION INTERFACE BETWEEN A CONTROL UNIT AND A HIGH VOLTAGE UNIT

(75) Inventors: Ian Bird-Radolovic, Vasteras (SE); Per V Carlsson, Vasteras (SE)

(73) Assignee: ABB Technology Ltd. (CH)

(*) Notice: Subject to any disclaimer, the term of this patent is extended or adjusted under 35 U.S.C. 154(b) by 76 days.

(21) Appl. No.: 12/643,749

(22) Filed: Dec. 21, 2009

(65) Prior Publication Data

US 2010/0133921 A1 Jun. 3, 2010

Related U.S. Application Data

(63) Continuation of application No. PCT/EP2007/056186, filed on Jun. 21, 2007.

(51) Int. Cl.
*H02H 11/00* (2006.01)
(52) U.S. Cl. ........................................ 307/326
(58) Field of Classification Search ............ 307/326
See application file for complete search history.

(56) References Cited

U.S. PATENT DOCUMENTS

| | | | | |
|---|---|---|---|---|
| 5,625,265 | A | * | 4/1997 | Vlahu ..................... 318/400.27 |
| 5,784,408 | A | * | 7/1998 | Lau .............................. 375/258 |
| 6,154,683 | A | * | 11/2000 | Kessler et al. ................ 700/150 |
| 6,922,324 | B1 | * | 7/2005 | Horwitz ........................ 361/234 |
| 7,272,152 | B2 | * | 9/2007 | Gross et al. ................... 370/447 |
| 7,276,814 | B2 | * | 10/2007 | Pozzuoli et al. ................ 307/77 |
| 7,302,282 | B2 | * | 11/2007 | McKim et al. ............. 455/575.1 |
| 2003/0211782 | A1 | | 11/2003 | Esparaz et al. |
| 2008/0051158 | A1 | * | 2/2008 | Male et al. .................... 455/572 |

FOREIGN PATENT DOCUMENTS

EP 0863640 A2 9/1998

OTHER PUBLICATIONS

International Search Report and Written Opinion of the International Searching Authority; PCT/EP2007/056186; Aug. 17, 2007; 10 pages.

* cited by examiner

*Primary Examiner* — Michael Rutland Wallis
(74) *Attorney, Agent, or Firm* — St. Onge Steward Johnston & Reens LLC

(57) ABSTRACT

A communication interface, between a control unit and a high voltage unit, includes a serial communication link between the control unit and the high voltage unit. The interface includes a signal transformer arranged as an isolation barrier between the control unit and the high voltage unit to ensure personal safety.

13 Claims, 1 Drawing Sheet

COMMUNICATION INTERFACE BETWEEN A CONTROL UNIT AND A HIGH VOLTAGE UNIT

CROSS-REFERENCE TO RELATED APPLICATIONS

The present application is a continuation of pending International patent application PCT/EP2007/056186 filed on Jun. 21, 2007, the content of which is incorporated herein by reference.

FIELD OF THE INVENTION

The present invention relates to a communication interface between a control unit and a high voltage unit comprising an isolation device arranged as an isolation barrier between the control unit and the high voltage unit to ensure personal safety. The present invention is useful in any systems including a control unit sending control signals to a high voltage unit, which impose a demand on the isolation between the high and low voltage parts in order to ensure personal safety, such as motor drives, high voltage power supply systems, systems for monitoring high voltage processes, and control systems of industrial robots.

BACKGROUND OF THE INVENTION

Parallel signal interfaces are often used for transferring control signals between a control unit and a high voltage unit. For example, a traditional multi-axis robot drive for an industrial robot is designed with a parallel interface between a robot controller and drive units. In many applications, the signal interface has to be galvanically isolated to comply with electrical safety regulations in order to avoid personal injury. The isolation of the parallel signal interface is achieved by means of optocouplers connected between the control unit and the power unit. However, there are some drawbacks with such a solution, such as high costs for optocouplers due to the large number of signals in the parallel interface. The large number of optocouplers leads to a large number of pins, which requires complex and expensive connectors and limits the cable length between the control unit and the power unit, and thereby limits the possibility of distributing the units. The reliability of the high voltage unit is affected in a negative way due to the large number of components and connector pins. In the multi-axis robot driveexample, the number of additional axis in the system is limited by the parallel interface.

In some applications, there is a desire to use a serial interface between the control unit and the high voltage unit. However, there are some drawbacks with using optocouplers for achieving the required isolation between the control unit and the high voltage unit when a serial interface is used. One drawback with optocouplers is the poor bandwidth. Due to the poor bandwidth, optocouplers can only be used in applications with low demand on communication speed. Optocouplers can handle communication speeds up to 10 Mbps. Another drawback with optocouplers is that they age faster and thus have a limited lifetime. Thus, optocouplers cannot be used in applications with high demand on the communication speed and reliability, such as a robot control system.

The object of the present invention is to provide an improved communication interface between a control unit and a high voltage unit, which comply with electrical safety regulations with regard to personal safety.

SUMMARY OF THE INVENTION

This object is achieved by the initially defined communication interface characterized in that the interface comprises a serial communication link between the control unit and the high voltage unit and a signal transformer adapted to transfer serial communication signals arranged as an isolation barrier between the control unit and the high voltage unit to ensure personal safety.

According to the invention, the galvanic isolation is achieved by means of a single signal transformer. The signal transformer provides a significantly improved bandwidth compared to the optocouplers, and enables a communication speed of up to 1 Gbps. This makes it possible to use serial communication in applications with a high demand on the bandwidth, as well as demands on the isolation between the high and low voltage parts in order to comply with electrical safety regulations, which today use a parallel interface. The invention makes it possible to omit the optocouplers, which leads to a significant reduction of the costs for the communication interface. A further advantage of using a signal transformer instead of optocouplers is the increased lifetime.

The transformer is designed so that it provides the required demand on the isolation between the high and low voltage parts. Since the demands vary between different applications, the design of the transformer varies in different applications. The design of the transformer must be such that it provides sufficient isolation to comply with applicable electrical safety regulations.

By control unit it is meant a low voltage unit including processing means, such as a CPU, adapted to execute a control program producing control signals. The control signals are transferred to the high voltage unit on the serial communication link. By a high voltage unit it is meant a unit comprising power electronics adapted to handle voltages above 48V.

According to an embodiment of the invention, the serial communication is Ethernet-based. This is advantageous since it makes it possible to use cheap standard Ethernet components, such as a standard Ethernet cable.

According to an embodiment of the invention, the serial communication link comprises a cable and a connector between the cable and the high voltage unit, and the transformer is arranged between the connector and the power electronics of the high voltage unit. In this embodiment, the transformer is used to protect the signal interface connector of the high voltage unit. Thereby, it is safe for a user to touch the connector between the high voltage unit and the cable.

According to a further embodiment of the invention, the high voltage unit comprises a printed circuit board provided with power electronics, and the transformer is arranged on the board. It is practical to arrange the transformer on the circuit board provided with power electronics.

In applications in which safety isolation is required, the transformer must have a reinforced isolation. With reinforced isolation means that the safety distance of the transformer has been increased according to safety regulations; preferably the safety distance has been doubled. This embodiment further improves the personal safety of the communication interface between the control unit and the high voltage unit.

According to an embodiment of the invention, the control unit and the high voltage unit are parts of a drive system of an industrial robot. Preferably, the control unit and the high voltage unit are adapted to control a plurality of motor axes of the robot, a so-called multi-axis robot drive. The invention is particularly useful in a multi-axis robot drive. Instead of using a parallel interface between the control unit and the high voltage unit, a serial communication is used. The transformer replaces the optocouplers used in the prior art. By using a serial communication link between the control unit and the high voltage unit, it is possible to use only one transformer for achieving the required isolation barrier between the control unit and the high voltage unit. The cost for the signal transformer is much less than the cost for the optocouplers. Thus, the cost for the communication interface between the control unit and the high voltage unit is reduced. By using a serial communication link between the control unit and the high voltage unit it is possible to distribute the high voltage unit.

BRIEF DESCRIPTION OF THE DRAWINGS

The invention will now be explained more closely by the description of different embodiments of the invention, and with reference to the appended figures.

DETAILED DESCRIPTION OF THE INVENTION

Figure 1:
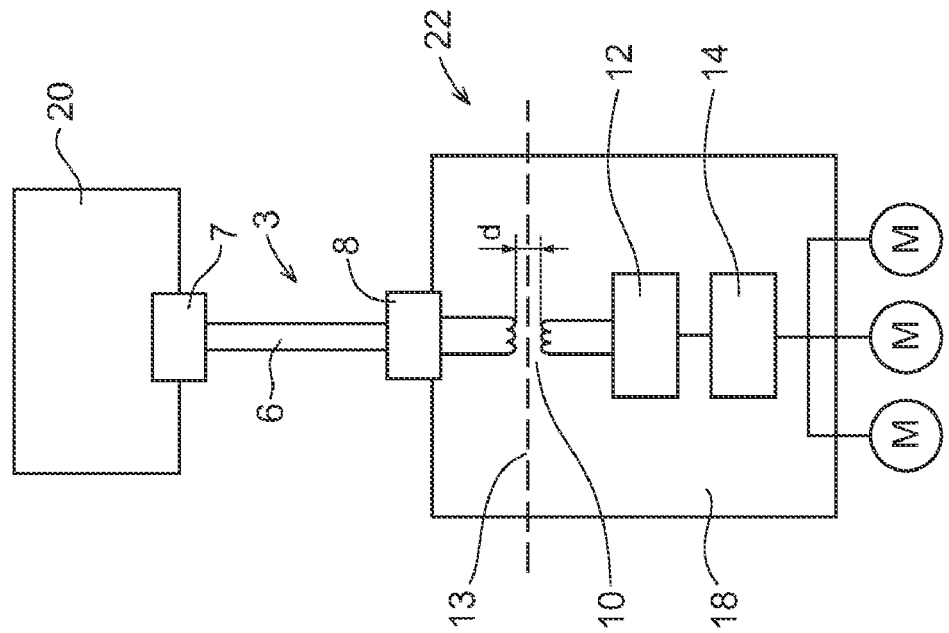
FIG. 1 shows a communication interface between a control unit and a high voltage unit according to an embodiment of the invention.

FIG. 1 shows a control unit 1 and a high voltage unit 2. For example, the control unit is a supervisory computer and the high voltage unit is a power-feeding device, which transfers status signals to the supervisory computer on the serial link. In another example, the control unit and the high voltage unit are parts of process equipment having a high power part that sends status signals to the control unit.

The control unit and the high voltage unit are connected via a communication interface having a serial communication link 3. The serial communication link 3 comprises a serial cable 6, for example an Ethernet cable, a first connector 7 arranged in the control unit for connecting the cable 6, and a second connector 8 arranged in the high voltage unit for connecting the cable 6 with the high voltage unit 2. Further, the serial communication link comprises an isolation device in the form of a signal transformer 10 arranged as an isolation barrier 13 between the control unit 1 and the high voltage unit 2 to ensure personal safety. The transformer 10 is physically located in the high voltage unit.

The signal transformer 10 is adapted to transfer serial communication signals and has at least a primary and a secondary winding. The transformer can have multiple windings depending on whether it is a full or a half duplex communication. The cable 6 includes a plurality of wires. The connectors 7 and 8 include corresponding wires. The transformer 10 is connected to the wires of the cable 6 via wires routed from the connector 8. A transformer with reinforced isolation should preferably be used to comply with electrical safety regulations.

The high voltage unit 2 further comprises a logic part 12, including circuits for communication, which is a low voltage part, and power electronics 14, which is a high voltage part. The logic part 12 is connected to the power electronics 14. The signal transformer 10 is arranged between the connector 8 and the logic part 12.

The signal transformer 10 is selected to provide enough isolation to comply with safety regulations for personal safety. For example, the safety distance d between the coils of the transformer is provided according to safety regulations. The safety distance required depends on the main voltage, pollution degree, and regulation standard. Another requirement is that the transformer must be able to withstand a certain voltage over a certain time without causing electrical breakdown of the isolation barrier. For example, the transformer should be able to withstand 4 kV for one minute without causing breakdown.

The high voltage unit 2 comprises a Printed Circuit Board 18, in the following called a PCB 18. The power electronics 14 and the logic part 12 are arranged on the PCB 18. The signal transformer 10 is also arranged on the PCB 18. The second connector 8 is arranged on the edge of the PCB 18 and is connected to the transformer 10 with wires arranged on the board. The transformer 10 is electrically connected to the logic part 12 via wires arranged on the PCB 18. In another embodiment, the PCB 18 may consist of more than one board, for example, the connector 8, the transformer 10, and the logic part 12 can be located on one board and the power electronics 14 can be located on another PCB.

The signal transformer 10 forms an isolation barrier 13 between the connector 8 and the logic part 12 and power electronics 14, thereby making it safe for a user to touch the connector 8, the cable 6, and the control unit 1.

The movements of the axes of an industrial robot are driven by motors mounted on each axis. The speeds and accelerations of the axes are controlled by the control system of the robot, which comprises a control unit generating control signals to the motors. The control signals determine motor torque, motor speed, and drive currents for the axes. The control system also comprises one or more drive units, which control the motors by converting DC current to a variable alternating current in dependence on the control signals from the control unit. The drive units are supplied with AC power. The drive unit includes a rectifier converting the supplied AC power into DC power, and a switching unit, denoted an inverter, converting the DC power to AC power in response to the control signals from the control unit. The motors are equipped with angle measuring devices to provide position feedback signals. The feedback signals from the angle measuring devices are transferred from the motors to the control unit.

Figure 2:
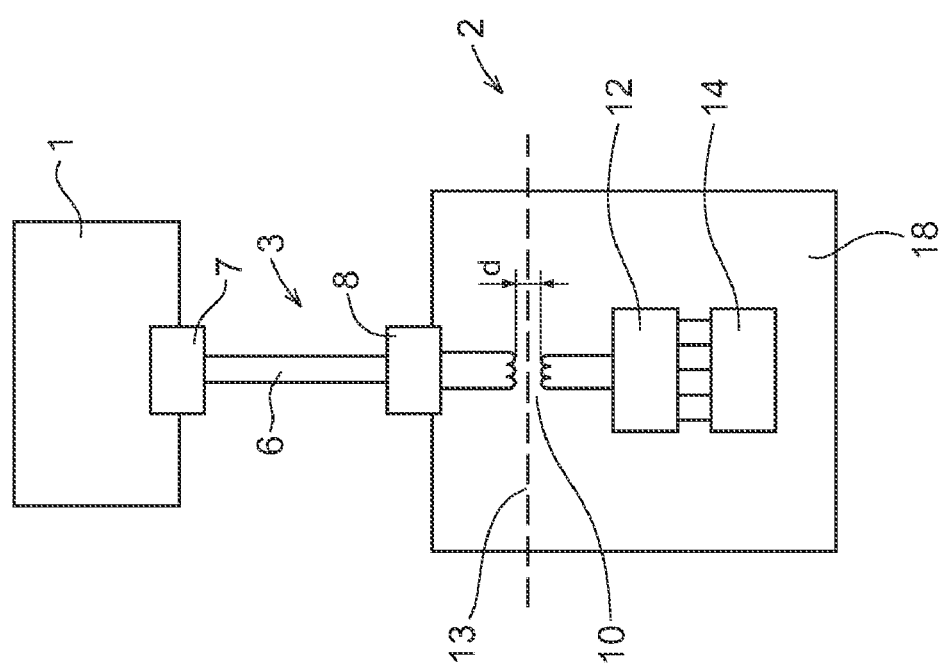
FIG. 2 shows a multi-axis robot drive including a communication interface according to an embodiment of the invention.

FIG. 2 shows an example of a communication interface between a control unit and a high voltage unit in a multi-axis robot drive. Like or corresponding parts as in FIG. 1 are indicated with the same reference numbers. The multi-axis robot drive includes a control unit 20 including software for current control of the motors driving the axes of the robot. The control unit 20 comprises hardware and software for generating voltage control signals. The multi-axis robot drive further includes a drive unit 22 including power electronics 14 for generating control signals to a plurality of motors, in this example three motors 23, 24, 25 which control the axes of the robot. Typically, the number of axes varies between three and seven. The control unit 20 and the drive unit 22 communicate with each other via an interface including a serial communication link 3 including two connectors 7, 8 and an Ethernet cable 6. Feedback signals of motor currents are transferred from the drive unit 22 to the control unit 20 via the serial communication link 3. The voltage control signals are transferred from the control unit 20 to the drive unit 22 via the serial communication link 3.

The signal transformer 10 forms an isolation barrier 13 between the connector 8 and the logic part 12 and the power electronics 14, thereby making it safe for a user to touch the connector 8, the cable 6, and the control unit 20.

What is claimed is:

1. A communication interface between a motor drive unit including power electronics for generating control signals to at least one motor and a control unit generating control signals to the motor drive unit, the interface comprising:

an isolation device arranged as an isolation barrier between the control unit and the drive unit to ensure personal safety, wherein the communication interface comprises an Ethernet data communications link using an Ethernet data communications format arranged between the control unit and the drive unit, and a logic part connected to the power electronics on the drive unit and including circuits for communication, said isolation device is a signal transformer adapted to transfer serial communication signals, the transformer is arranged on the drive unit, between the Ethernet data communications link and the logic part, and the transformer has a reinforced isolation and is able to withstand 4 kV for one minute without causing breakdown.

2. The communication interface according to claim 1, wherein the Ethernet data communications link comprises a cable and a connector between the cable and the drive unit, and the transformer is arranged between the connector and the power electronics.

3. The communication interface according to claim 1, wherein the drive unit comprises a printed circuit board provided with said power electronics and the transformer is arranged on the printed circuit board.

4. The communication interface according to claim 1, wherein the drive unit is designed for handling a voltage of more than 48V.

5. The communication interface according to claim 1, wherein the control unit and the drive unit are parts of a drive system of an industrial robot.

6. The communication interface according to claim 5, wherein the control unit and the drive unit are adapted to control a plurality of motor axes of the robot.

7. An interface system comprising:
a motor drive unit including power electronics, said motor drive generating control signals for at least one motor;
a logic part connected to the power electronics on said motor drive unit, said logic part having circuits for communication;
a control unit generating control signals for said motor drive unit;
said motor drive unit connected to said control unit via an Ethernet data communications link using an Ethernet data communications format;
an isolation device positioned between said control unit and said logic part, said isolation device comprising a signal transformer transferring communication signals;
said signal transformer is reinforced to withstand 4 kV for at least one minute without a breakdown.

8. The interface according to claim 7 wherein said signal trans-former positioned on said motor drive unit between the Ethernet data communications link and said control unit.

9. The interface according to claim 7, wherein the Ethernet data communications link comprises a cable and a connector between the cable and said motor drive unit, and the transformer is arranged between the connector and the motor drive unit.

10. The interface according to claim 7, wherein the motor drive unit comprises a printed circuit board and the transformer is arranged on the printed circuit board.

11. The interface according to claim 7, wherein the motor drive unit is designed for handling at least 48V.

12. The interface according to claim 7, wherein the control unit and the motor drive unit are parts of a drive system of an industrial robot.

13. The interface according to claim 12, wherein the control unit and the motor drive unit are adapted to control a plurality of motor axes of the robot.

* * * * *